(12) United States Patent
Liang

(10) Patent No.: US 11,857,114 B1
(45) Date of Patent: Jan. 2, 2024

(54) HAND-HELD ELECTRIC BARBECUE DEVICE

(71) Applicant: Leen Liang, Guangdong (CN)

(72) Inventor: Leen Liang, Guangdong (CN)

(73) Assignee: FOSHAN DEYE TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 18/356,834

(22) Filed: Jul. 21, 2023

(30) Foreign Application Priority Data

Jul. 14, 2023 (CN) .......................... 202310867964.5

(51) Int. Cl.
A47J 43/28 (2006.01)
A47J 43/18 (2006.01)

(52) U.S. Cl.
CPC ............. *A47J 43/283* (2013.01); *A47J 43/18* (2013.01)

(58) Field of Classification Search
CPC .................................................... A47J 43/283
USPC ........................................................ 99/419
See application file for complete search history.

(56) References Cited

U.S. PATENT DOCUMENTS

| 4,126,086 | A | * | 11/1978 | Valade | A47J 37/0694 |
| | | | | | 99/421 A |
| 5,117,558 | A | * | 6/1992 | Hull | A47J 43/18 |
| | | | | | 99/421 H |
| 5,445,063 | A | | 8/1995 | Sherman | |
| 5,896,668 | A | | 4/1999 | Murrell | |
| 2009/0162508 | A1 | * | 6/2009 | Davies | A47J 19/02 |
| | | | | | 426/481 |

* cited by examiner

Primary Examiner — Dana Ross
Assistant Examiner — Joseph W Iskra

(57) ABSTRACT

The present disclosure provides a hand-held electric barbecue device, including a handle, where the handle is internally provided with a driving system and a linkage mechanism, the linkage mechanism is in driving connection to an output end of the driving system and is detachably connected to a barbecue fork, and the barbecue fork is in driving connection to the driving system through the linkage mechanism. The barbecue fork is detachably connected to an interior of the handle through the linkage mechanism, which facilities the change of different forks to meet different barbecue requirements.

9 Claims, 5 Drawing Sheets

HAND-HELD ELECTRIC BARBECUE DEVICE

TECHNICAL FIELD

The present disclosure relates to the field of barbecue devices, in particular to a hand-held electric barbecue device.

BACKGROUND

Barbecue is a popular way of cooking when people have a picnic or camping outdoors. At present, the barbecue is conducted on a campfire and a barbecue grill. When barbecuing on a campfire, people usually have a barbecue with a traditional manual barbecue fork. However, the food is easily burnt excessively due to the fact that people cannot completely focus on barbecuing as they often communicate with others. On the contrary, the food may be very delicious when the barbecue grill is used to roast food, but people may lose some fun from barbecue. Moreover, the existing barbecue forks are mostly of a non-removable structure, so that only one kind of fork head can be used. Different kinds or numbers of food can be roasted only by preparing for a plurality of barbecue forks, which causes inconvenience in storage and carrying. Hence, the hand-held electric barbecue device is urgently needed to solve the foregoing problem.

SUMMARY

The present disclosure aims to provide a hand-held electric barbecue device. The hand-held barbecue device turns automatically to prevent the taste of food from being affected as the food is unevenly heated due to untimely turning; and meanwhile, the different types of barbecue forks can be changed according to user's needs.

In order to achieve the above object, the present disclosure provides the following technical solution:

A hand-held electric barbecue device, including a handle, where the handle is internally provided with a driving system and a linkage mechanism. The linkage mechanism is in drive connection to an output end of the driving system and is detachably connected to a barbecue fork, and the barbecue fork is in drive connection to the driving system through the linkage mechanism. The fork head rotates following the output end of the driving system, which enables the food to be turned automatically during roasting so as to prevent the taste from being affected as the food is burnt on account of forgetting to turn.

Further, the linkage mechanism includes a rotating sleeve and a bolt, where the bolt is fixedly arranged inside the rotating sleeve in a diameter direction thereof, a connecting end of the barbecue fork is provided with a locking mechanism, and the locking mechanism is in clamping connection to the bolt.

Further, an end part of one end, in clamping connection to the bolt, of the locking mechanism is provided with an open slot formed in an axial direction thereof; the locking mechanism is rotatably provided with a connection slot at a notch in a bottom of the open slot in a peripheral direction of the locking mechanism, and the connection slot is in communication with and perpendicular to the open slot; and widths of the open slot and the connection slot fit a diameter of the bolt, so that the bolt is capable of entering the open slot and is in clamping connection in the connection slot. By switching the bolt at the open slot or the connection slot, the locking mechanism and the rotating sleeve are switched in a locked manner in an axial direction, which facilitates the change of different barbecue forks.

Further, a bulge is arranged on a slot wall of the connection slot at an intersection between the connection slot and the open slot, a width between the bulge and each of opposite inner walls of the connection slot is less than the diameter of the bolt, and the bolt may enter the connection slot by virtue of elastic deformation of the locking mechanism.

Further, the driving system includes a motor, where an output end of the motor is a D-shaped shaft, and an input end of the rotating sleeve is connected to the D-shaped shaft of the motor.

Further, one end of the handle is provided with an insertion port for inserting the barbecue fork, the handle is internally provided with a first bearing mounting slot and a second bearing mounting slot corresponding to the insertion port, the first bearing mounting slot and the second bearing mounting slot are internally provided with a first bearing and a second bearing, respectively, and the rotating sleeve is arranged inside the handle through the first bearing and the second bearing.

Further, the driving system further includes a circuit board and a battery, and the motor, the circuit board and the battery are electrically connected.

Further, one side of the circuit board is further provided with a button, configured to switch on and off states of the motor and a rotating speed of the motor.

Further, the barbecue fork includes a fork head, where a telescopic rod is arranged between the fork head and the linkage mechanism, a connecting end of the fork head is fixedly connected to an innermost rod body of the telescopic rod, an end part of an outermost rod body of the telescopic rod is fixedly connected to the locking mechanism, and the fork head is detachably connected to the rotating sleeve through the telescopic rod and the locking mechanism. The length of the hand-held electric barbecue device may be shortened by using the telescopic rod, which facilitates storage and carrying.

Further, a food connecting end of the barbecue fork may be one of a U-shaped structure, a straight bar structure or a tree structure with multiple branches, so a user may selectively change it according to his/her needs.

As can be seen from the analysis, the present disclosure provides a hand-held electric barbecue device. The hand-held barbecue device turns automatically to prevent the taste of food from being affected as the food is unevenly heated due to untimely turning; and meanwhile, the different types of barbecue forks can be changed according to user's needs. Hence, the hand-held electric barbecue device is convenient to use, store and carry.

BRIEF DESCRIPTION OF THE DRAWINGS

The drawings constituting a part of the present application help to further appreciate the present disclosure. The illustrative embodiments of the present disclosure and the description thereof are used for explaining the present disclosure rather than constituting an improper limitation to the present disclosure. In the drawings.

Figure 1:
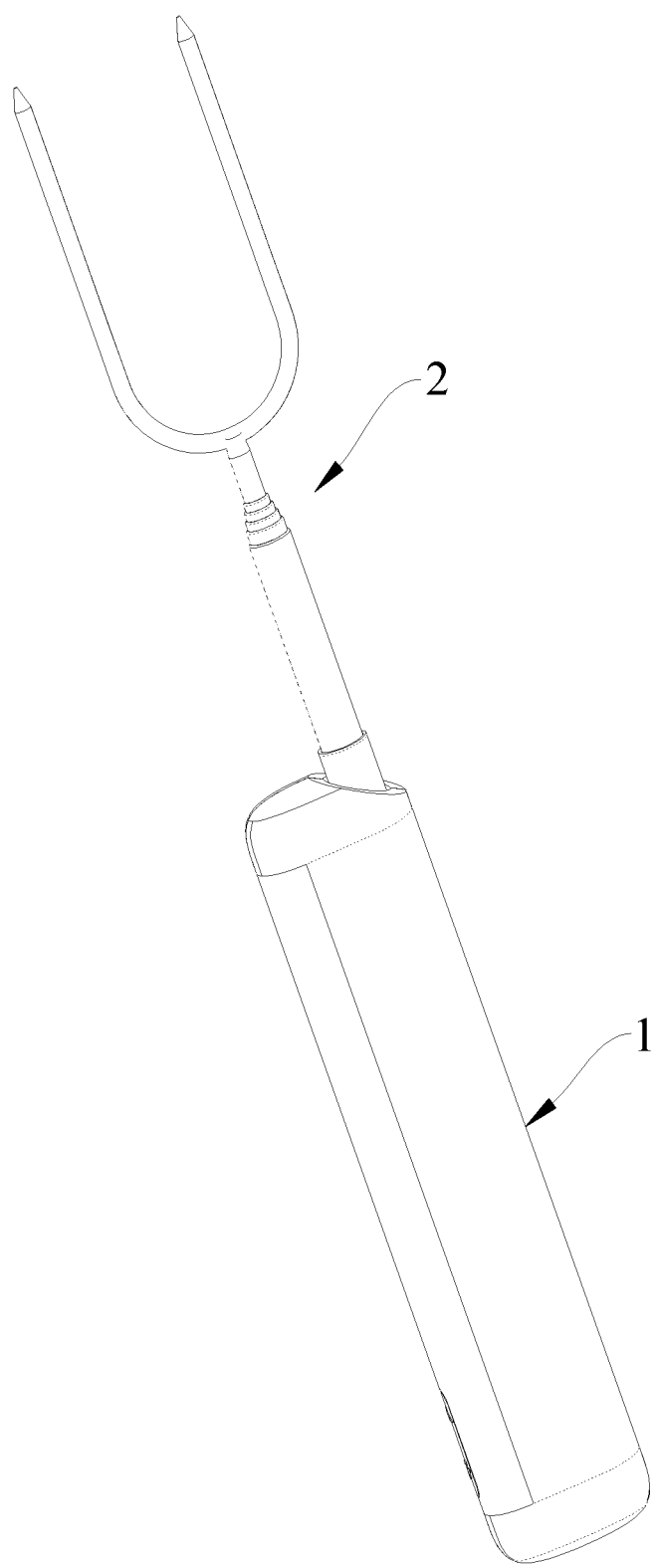
FIG. 1 is a structural schematic diagram of a hand-held electric barbecue device in an embodiment.

Description of numerals in the drawings: 1—handle; 11—first housing; 12—second housing; 121—insertion port; 122—first bearing mounting slot; 123—second bearing mounting slot; 2—barbecue fork; 20—fork head; 21—locking mechanism; 211—open slot; 212—connection slot; 213—bulge; 22—telescopic rod; 3—driving system; 31—motor; 32—circuit board; 33—battery; 34—button; 4—linkage mechanism; 41—rotating sleeve; 42—bolt; 5—first bearing; 6—second bearing.

DESCRIPTION OF THE EMBODIMENTS

The present disclosure will be described in detail below with reference to the drawings and in conjunction with embodiments. The various examples are provided by way of explanation of the present disclosure rather than limitation to the present disclosure. Indeed, it will be apparent to those skilled in the art that modifications and variations may be made in the present disclosure without departing from the scope or spirit of the present disclosure. For example, features shown or described as part of one embodiment may be used in another embodiment to produce yet another embodiment. It is therefore desirable that the present disclosure encompass such modifications and variations falling within the scope of the appended claims and their equivalents.

In the description of the present disclosure, the terms "longitudinal", "transverse", "up", "down", "front", "back", "left", "right", "perpendicular", "horizontal", "top", "bottom" and the like denote orientation or positional relationships based on those shown in the drawings and are merely intended to describe the present disclosure conveniently rather than requiring that the present disclosure must be constructed and operated in a particular orientation, and therefore, they cannot be construed as limitations to the present disclosure. The terms "joint", "connect" and "set" used in the present disclosure should be understood in a broad sense, for example, which may refer to a fixed connection or a detachable connection; which may refer to a direct connection or an indirect connection through intermediate components; which may refer to a wired electrical connection, a radio connection, or a wireless communication signal connection, and the specific meanings of the above terms may be understood by those of ordinary skill in the art according to a specific situation.

One or more examples of the present disclosure are shown in the drawings. The detailed description uses numeric and alphabetic markers to refer to features in the drawings. Similar or like reference signs in the drawings and descriptions have been used to refer to similar or like parts of the present disclosure. As used herein, the terms "first", "second" and "third" and the like are used interchangeably to distinguish one member from another and are not intended to denote the location or importance of individual members.

Figure 2:
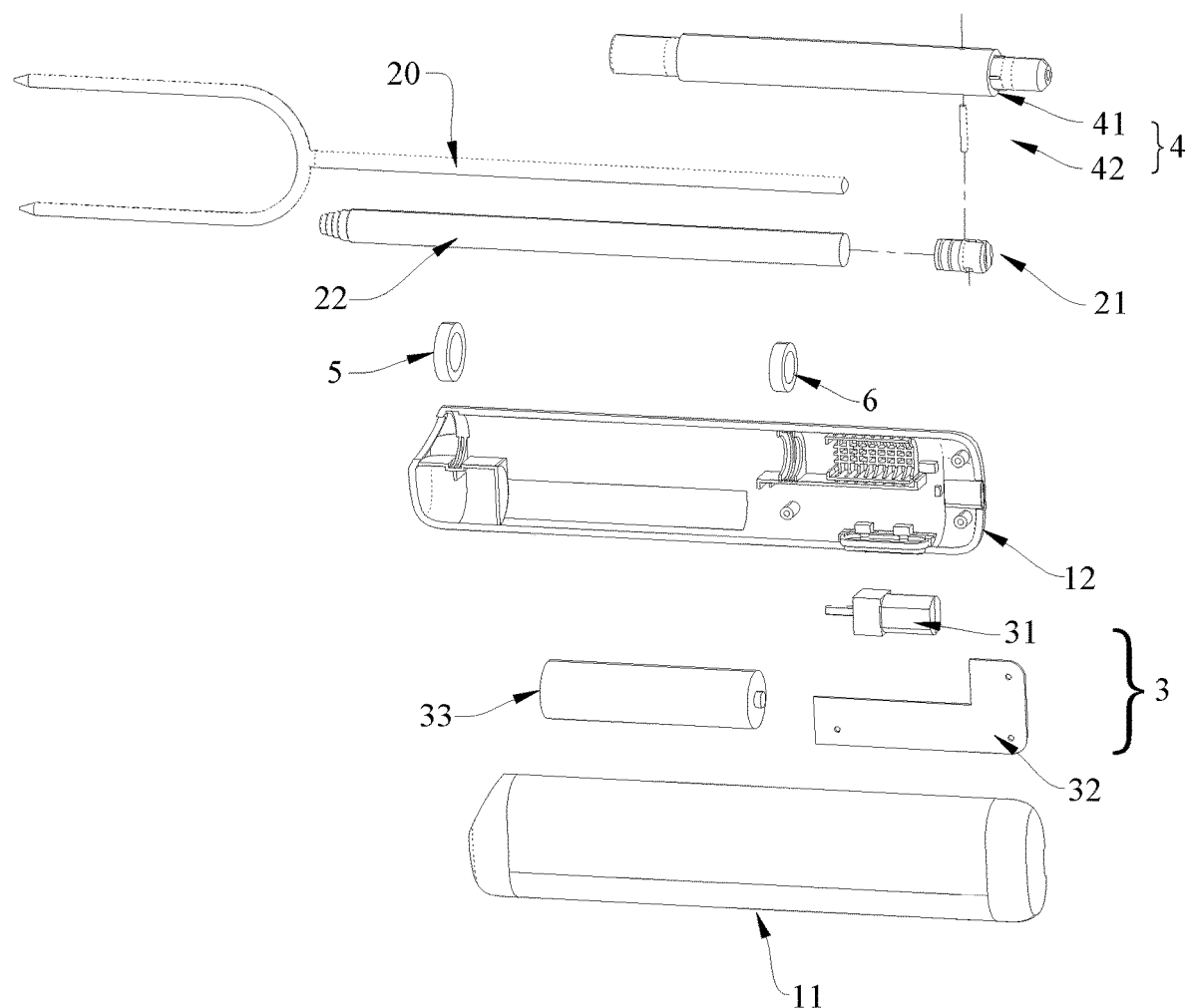
FIG. 2 is a structural schematic exploded view of a hand-held electric barbecue device in an embodiment.
Figure 3:
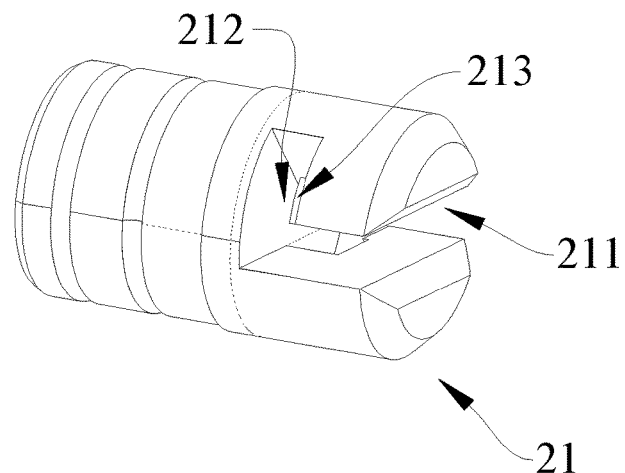
FIG. 3 is a structural schematic diagram of a display end surface of a locking mechanism of a hand-held electric barbecue device in an embodiment.
Figure 4:
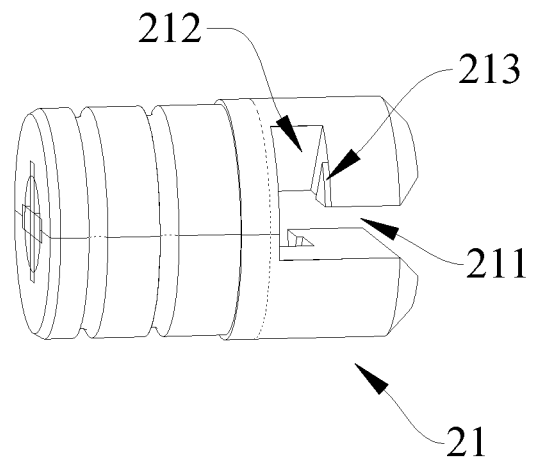
FIG. 4 is a structural schematic diagram of a display side surface of a locking mechanism of a hand-held electric barbecue device in an embodiment.
Figure 5:
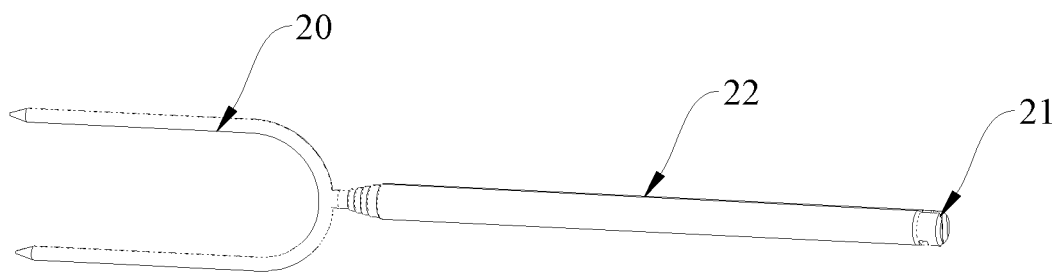
FIG. 5 is a structural schematic diagram of a telescopic fork head and a locking mechanism of a hand-held electric barbecue device in an embodiment.
Figure 6:
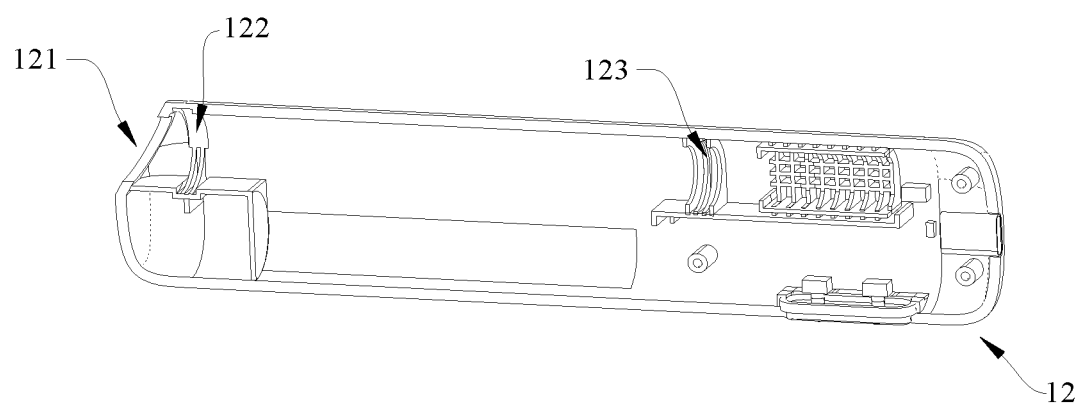
FIG. 6 is a structural schematic diagram of an interior of a second housing of a hand-held electric barbecue device in an embodiment.
Figure 7:
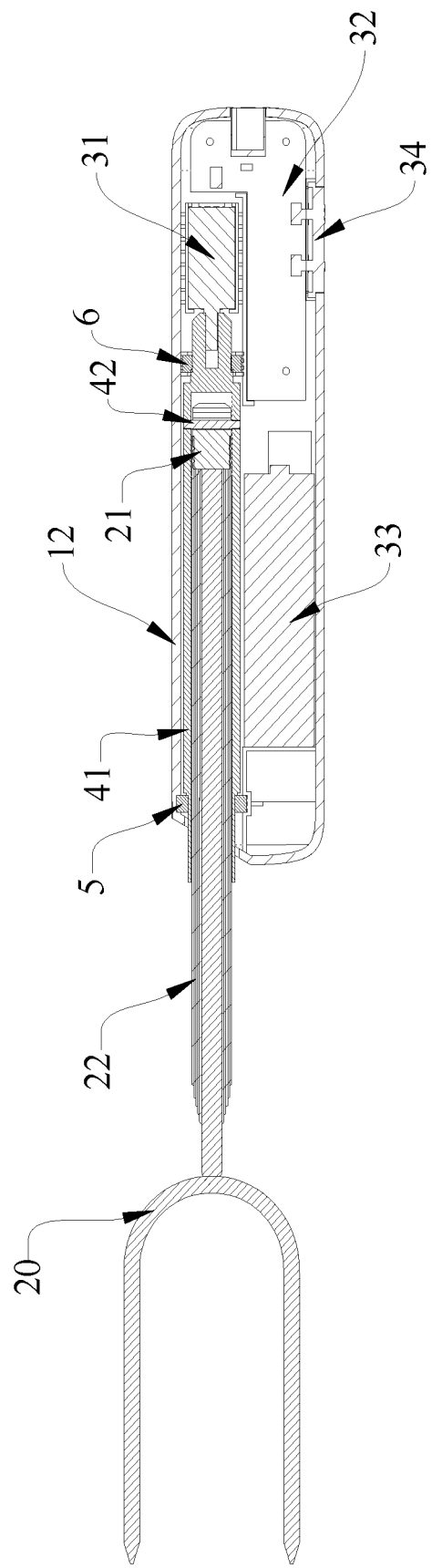
FIG. 7 is a schematic cross-sectional view of a hand-held electric barbecue device in an embodiment.
Figure 8:
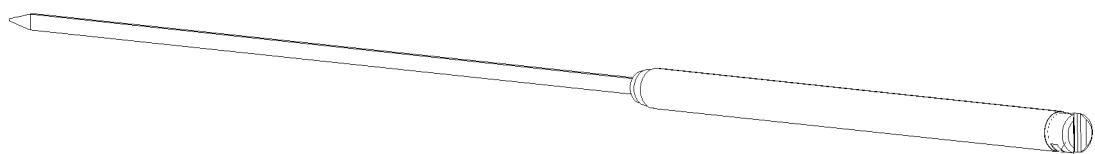
FIG. 8 is a schematic structural diagram of a food connecting end, as a straight rod, of a barbecue fork of a hand-held electric barbecue device in an embodiment.

As shown in FIGS. 1 to 8, according to the embodiment of the present disclosure, provided is a hand-held electric barbecue device, including a handle 1, where the handle 1 is provided with a barbecue fork 2 and is internally provided with a driving system 3 and a linkage mechanism 4, the barbecue fork 2 is detachably connected to the linkage mechanism 4, and the linkage mechanism 4 is in drive connection to an output end of the driving system 3, so that the barbecue fork 2 is in drive connection to the driving system 3 through the linkage mechanism 4, and the driving system 3 may control the rotating state and speed of the barbecue fork 2.

Specifically, the linkage mechanism 4 includes a rotating sleeve 41 and a bolt 42, and the bolt 42 is fixedly arranged at one end inside the rotating sleeve 41 in a diameter direction of the sleeve. The barbecue fork 2 includes a fork head 20, where a connecting end of the fork head 20 is fixedly connected to a locking structure 21, the fork head 20 is inserted into the rotating sleeve 41 after being fixedly connected to the locking mechanism 21, and the locking mechanism 21 is detachably connected to the rotating sleeve 41 through the bolt 42.

Specifically, a diameter of the other end of the locking mechanism 21 is provided with an open slot 211 in an axial direction, the locking mechanism 21 is located at the bottom of the open slot 211 to clockwise rotate at a certain angle in a circumferential direction around an axis of the locking mechanism 21, thus forming a connection slot 212; the connection slot 212 is in communication with and perpendicular to the open slot 211, and widths of the open slot 211 and the connection slot 212 fit a diameter of the bolt 42, so that the bolt 42 is capable of entering the bottom of the open slot 211. The bolt 42 clockwise rotates to the interior of the connection slot 212 after entering the bottom of the open slot 211, which enables the locking mechanism 21 and the rotating sleeve 41 to be limited in an axial direction. When the bolt 42 rotates away from the connection slot 212 anticlockwise, and then enters the open slot 211, the locking mechanism 21 may be pulled out of the rotating sleeve 41 in an axial direction, thus changing the different barbecue forks 2. In the embodiment, a food connecting end of the fork head 20 is of a U shape structure. The fork head 20 may be also of a single straight rod structure or a tree structure with multiple branches, which facilitates roasting of many kinds of food at one time. Hence, a user may change the fork head according to his/her needs. There are many shapes of food connecting ends of the fork head 20, which will not be discussed in full details here.

Further, a bulge 213 is arranged on a slot wall of the connection slot 212 at an intersection between the connection slot 212 and the open slot 211, and a width between the bulge 213 and each of opposite inner walls of the connection slot 212 is less than the diameter of the bolt 42; and the bolt 42 may enter the connection slot 212 by virtue of elastic deformation of the locking mechanism 21, so that the bolt 42 is locked in the connection slot 212 through the bulge 213, thus locking the locking mechanism 21 and the rotating sleeve 41 in a circumferential direction.

Specifically, the driving system 3 includes a motor 31, where an output end of the motor 31 is provided with a D-shaped shaft, and an end part of the rotating sleeve 41 is connected to the D-shaped shaft of the output end of the motor 31; and the rotating sleeve 41 is driven by the motor 31 to rotate, thus driving the fork head of the barbecue fork 2 to rotate, which enables the food on the barbecue fork 2 to turn over to be heated evenly. The driving system 3 further includes a circuit board 32 and a battery 33, where the motor 31, the circuit board 32 and the battery 33 are electrically connected, one side of the circuit board 32 is further provided with a button 34, configured to switch on and off states of the motor 31 and a rotating speed of the motor 31. In the embodiment, the motor 31 may be set to rotate forward or backward. When the direction in which the bolt 42 is driven by the motor 31 to rotate is the same as the arrangement direction of the connection slot 212, the barbecue fork 2 will not fall off automatically during use. When the direction in which the bolt 42 is driven by the motor 31 to rotate is opposite to the arrangement direction of the connection slot 212, a torque generated by the motor 21 at the bolt 42 is not enough to support the bolt 42 to cross the bulge 213. Therefore, the barbecue fork 2 will not fall off automatically.

Further, the handle 1 includes a first housing 11 and a second housing 12, where the first housing 11 is detachably connected to the second housing 12, and one end of the second housing 12 is provided with an insertion port 121, which enables the barbecue fork 2 to be inserted into the handle 1; the second housing 12 is internally provided with a first bearing mounting slot 122 and a second bearing mounting slot 123 corresponding to a linear direction of the insertion port 121, the first bearing mounting slot 122 and the second bearing mounting slot 123 are internally provided with a first bearing 5 and a second bearing 6, respectively, the inner diameters of the first bearing 5 and the second bearing 6 fit an outer diameter of the rotating sleeve 41, and the rotating sleeve 41 is arranged in the second housing 12 through the first bearing 5 and the second bearing 6 to facilitate the rotation of the rotating sleeve 41.

Further, to conveniently store and carry the hand-held electric barbecue device, a telescopic rod 22 is arranged between the fork head 20 and the locking mechanism 21, a connecting end of the fork head 20 is fixedly connected to an innermost rod body of the telescopic rod 22, an end part of an outermost rod body of the telescopic rod 22 is fixedly connected to the locking mechanism 21, and the fork head 20 is detachably connected to the rotating sleeve 41 through the telescopic rod 22 and the locking mechanism 21.

From the above description, it can be seen that the above embodiment of the present disclosure achieves the following technical effects:

1. The barbecue fork 2 is rotatably connected to the driving system 3 through the linkage mechanism 4, the barbecue fork 2 rotates following the output end of the driving system 3, which enables the food to be turned automatically during roasting so as to prevent the taste from being affected as the food is burnt on account of forgetting to turn.

2. The linkage mechanism 4 includes the rotating sleeve 41 and the bolt 42, the bolt 42 is transversely inserted and secured inside the rotating sleeve 41, the end part of the locking mechanism 21 is provided with the open slot 211 and the connection slot 212, the rotating sleeve 41 is switched by the bolt 42 at the open slot 211 or the connection slot 212, so the locking mechanism 21 and the rotating sleeve 41 are switched in a locked manner in an axial direction, which facilitates the change of different barbecue forks 2.

3. The bulge 213 is arranged at an edge of an intersection between the connection slot 212 and the open slot 211; when the bolt 42 rotates inward the connection slot 212, the bolt 42 may enter the connection slot 212 by virtue of elastic deformation of the locking mechanism 21, so that the bolt 42 is locked inside the connection slot 212 through the bulge 213, thus locking the locking mechanism 21 and the rotating sleeve 41 in a circumferential direction.

4. The telescopic rod 22 is arranged between the fork head 20 and the locking mechanism 21, and the length of the hand-held electric barbecue device is shortened by means of a telescopic function of the telescopic rod 22, so that the hand-held electric barbecue device is convenient to store and carry.

Compared with the prior art, the hand-held barbecue device turns automatically to prevent the taste of food from being affected as the food is unevenly heated due to untimely turning; and meanwhile, the different types of barbecue forks can be changed according to user's needs. Hence, the hand-held electric barbecue device is convenient to use, store and carry.

The foregoing is merely a preferred embodiment of the present disclosure and is not intended to limit the present disclosure which may be subject to various modifications and variations to those skilled in the art. Any modification, equivalent replacement, improvement, etc. made within the spirit and principles of the present disclosure shall be included in the scope of protection of the present disclosure.

What is claimed is:

1. A hand-held electric barbecue device, comprising a handle, wherein the handle is internally provided with a driving system and a linkage mechanism, the linkage mechanism is in driving connection to an output end of the driving system and is detachably connected to a barbecue fork, and the barbecue fork is in driving connection to the driving system through the linkage mechanism;

wherein the linkage mechanism comprises a rotating sleeve and a bolt, the bolt is fixedly arranged inside the rotating sleeve in a diameter direction thereof, and a connecting end of the barbecue fork is provided with a locking mechanism, and the locking mechanism is in clamping connection to the bolt.

2. The hand-held electric barbecue device according to claim 1, wherein an end part of one end, in clamping connection the bolt, of the locking mechanism is provided with an open slot formed in an axial direction thereof, the locking mechanism is provided with a connection slot in a peripheral direction of the locking mechanism at a notch in a bottom of the open slot, and the connection slot is in communication with and perpendicular to the open slot; and widths of the open slot and the connection slot fit a diameter of the bolt, so that the bolt is capable of entering the open slot and is in clamping connection to the connection slot.

3. The hand-held electric barbecue device according to claim 2, wherein a bulge is arranged on a slot wall of the connection slot at an intersection between the connection slot and the open slot, a width between the bulge and each of opposite inner walls of the connection slot is less than the diameter of the bolt, and the bolt is capable of entering the connection slot by virtue of elastic deformation of the locking mechanism.

4. The hand-held electric barbecue device according to claim 1, wherein the driving system comprises a motor, an output end of the motor is a D-shaped shaft, and an input end of the rotating sleeve is connected to the D-shaped shaft of the motor.

5. The hand-held electric barbecue device according to claim 1, wherein one end of the handle is provided with an insertion port for inserting the barbecue fork, the handle is internally provided with a first bearing mounting slot and a second bearing mounting slot corresponding to the insertion port, the first bearing mounting slot and the second bearing mounting slot are internally provided with a first bearing and a second bearing, respectively, and the rotating sleeve is arranged in the handle through the first bearing and the second bearing.

6. The hand-held electric barbecue device according to claim 4, wherein the driving system further comprises a circuit board and a battery, and the motor, the circuit board and the battery are electrically connected.

7. The hand-held electric barbecue device according to claim 6, wherein one side of the circuit board is further provided with a button, configured to switch on and off states of the motor and a rotating speed of the motor.

8. The hand-held electric barbecue device according to claim 1, wherein the barbecue fork comprises a fork head, a telescopic rod is arranged between the fork head and the locking mechanism, a connecting end of the fork head is fixedly connected to an innermost rod body of the telescopic rod, an end part of an outermost rod body of the telescopic rod is fixedly connected to the locking mechanism, and the fork head is detachably connected to the rotating sleeve through the telescopic rod and the locking mechanism.

9. The hand-held electric barbecue device according to claim 1, wherein a food connecting end of the barbecue fork may be of a U-shaped structure, a straight bar structure or a tree structure with multiple branches.

* * * * *